US008230319B2

(12) United States Patent
Arida et al.

(10) Patent No.: US 8,230,319 B2
(45) Date of Patent: Jul. 24, 2012

(54) WEB-BASED VISUALIZATION, REFRESH, AND CONSUMPTION OF DATA-LINKED DIAGRAMS

(75) Inventors: Phillippe-Joseph Arida, Redmond, WA (US); Po-Yan Tsang, Seattle, WA (US); William G Morein, Seattle, WA (US); Abraham Mathew, Edmonds, WA (US); Loic Henry-Greard, Sammamish, WA (US); Raveendrnathan Loganathan, Redmond, WA (US); Sung Won Shin, Issaquah, WA (US); Heidi McAllister, Brier, WA (US); John Wang, Kirkland, WA (US); Emil Cicos, Kirkland, WA (US); Mairead Therese Droney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1115 days.

(21) Appl. No.: 12/024,055

(22) Filed: Jan. 31, 2008

(65) Prior Publication Data
US 2009/0199081 A1  Aug. 6, 2009

(51) Int. Cl.
*G06F 17/00* (2006.01)
(52) U.S. Cl. ........ 715/204; 715/201; 715/207; 715/211; 715/765; 715/839; 707/611; 705/7.27
(58) Field of Classification Search .................. 715/201, 715/204, 207, 211, 765, 839; 707/611; 705/7.27
See application file for complete search history.

(56) References Cited

U.S. PATENT DOCUMENTS

| | | | |
|---|---|---|---|
| 6,289,299 B1* | 9/2001 | Daniel et al. .................. | 703/21 |
| 6,363,394 B1 | 3/2002 | Rajarajan et al. | |
| 6,704,024 B2 | 3/2004 | Robotham et al. | |
| 7,039,723 B2 | 5/2006 | Hu et al. | |
| 7,257,771 B2 | 8/2007 | Buser et al. | |
| 7,272,616 B1* | 9/2007 | McKinnon .......................... | 1/1 |
| 7,548,925 B2* | 6/2009 | Bradlee et al. .................. | 1/1 |
| 7,694,308 B1* | 4/2010 | Dickson et al. ............... | 719/312 |
| 7,950,027 B2* | 5/2011 | Arnquist et al. ............... | 719/331 |
| 2002/0010571 A1* | 1/2002 | Daniel et al. ..................... | 703/21 |
| 2005/0131750 A1* | 6/2005 | Kogan et al. ..................... | 705/9 |
| 2005/0216883 A1 | 9/2005 | Ishimitsu et al. | |
| 2005/0278571 A1 | 12/2005 | Auvenshine et al. | |
| 2006/0167924 A1 | 7/2006 | Bradlee et al. | |

(Continued)

OTHER PUBLICATIONS

International Business Machines, Tivoli Monitoring for Transaction Performance, First Edition Feb. 2005, pp. 1-22.*

(Continued)

*Primary Examiner* — Adam M Queler
*Assistant Examiner* — Matthew Ludwig
(74) *Attorney, Agent, or Firm* — Hope Baldauff Hartman, LLC

(57) ABSTRACT

Technologies are described herein for refreshing data-linked diagrams on a server computer and viewing and consuming the refreshed diagrams via a Web browser. A drawing program allows equations within a diagram definition to define how external data is utilized to modify the attributes of a diagram element. When the diagram is published to a server computer, the definition is converted to server-legible definition. A published diagram is generated that includes a diagram representation defined by the server-legible definition. Upon a request for the published diagram, the external data is refreshed and the diagram definition is updated. The equations are recalculated to generate new element attributes. The diagram representation is then updated with the new attributes and returned for display by a client Web browser. An interface provides exploration tools and a client API exposes methods for surfacing external data and annotating the diagram.

20 Claims, 7 Drawing Sheets

U.S. PATENT DOCUMENTS

2007/0067425 A1* 3/2007 McKinney .................... 709/223
2008/0127051 A1* 5/2008 Milligan ....................... 717/105
2008/0243902 A1* 10/2008 Rong et al. .................... 707/102

OTHER PUBLICATIONS

International Business Machines, Tivoli 'Navigating and understanding the Topology Report', published Feb. 2005, pp. 1-21.*

Stern, "Using New Features of Designer/2000 and Developer/2000 with Oracle RDB", pp. 8.

Ceri, et al., "Conceptual modeling of data-intensive Web applications", IEEE Internet Computing, vol. 6, Issue.4, 2002, IEEE, pp. 20-30.

Zhao, et al.,"Generating mobile device user interfaces for diagram-based modelling", Proceedings of the 7th Australasian User interface conference, vol. 50, Australian Computer Society, Inc, 2006, pp. 101-108.

Stern, "Using New Features of Designer/2000 and Developer/2000 with Oracle RDB," downloaded Jan. 17, 2008 from http://www.fors.com/coug97/papers/0517.htm, 8 pages.

* cited by examiner

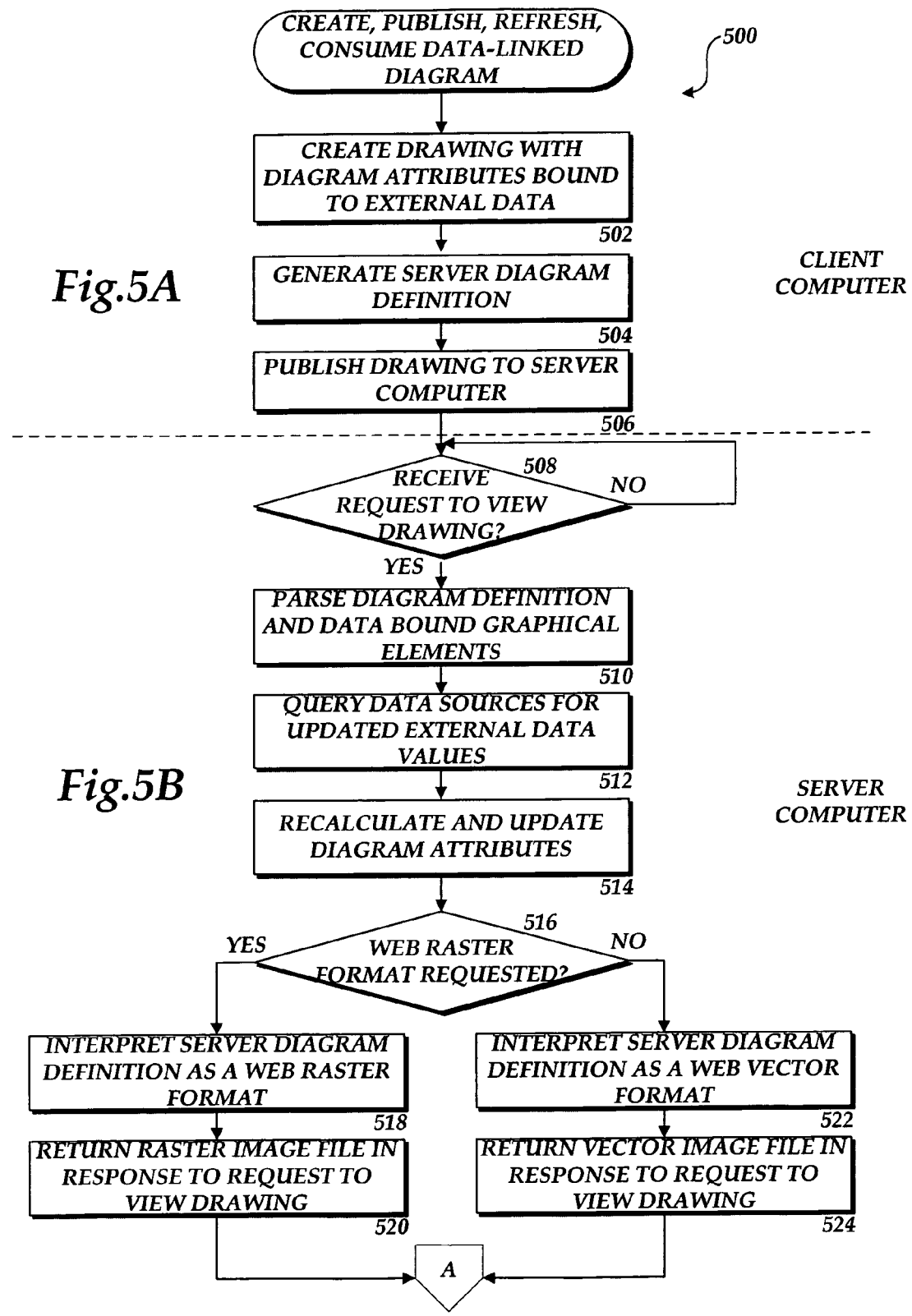

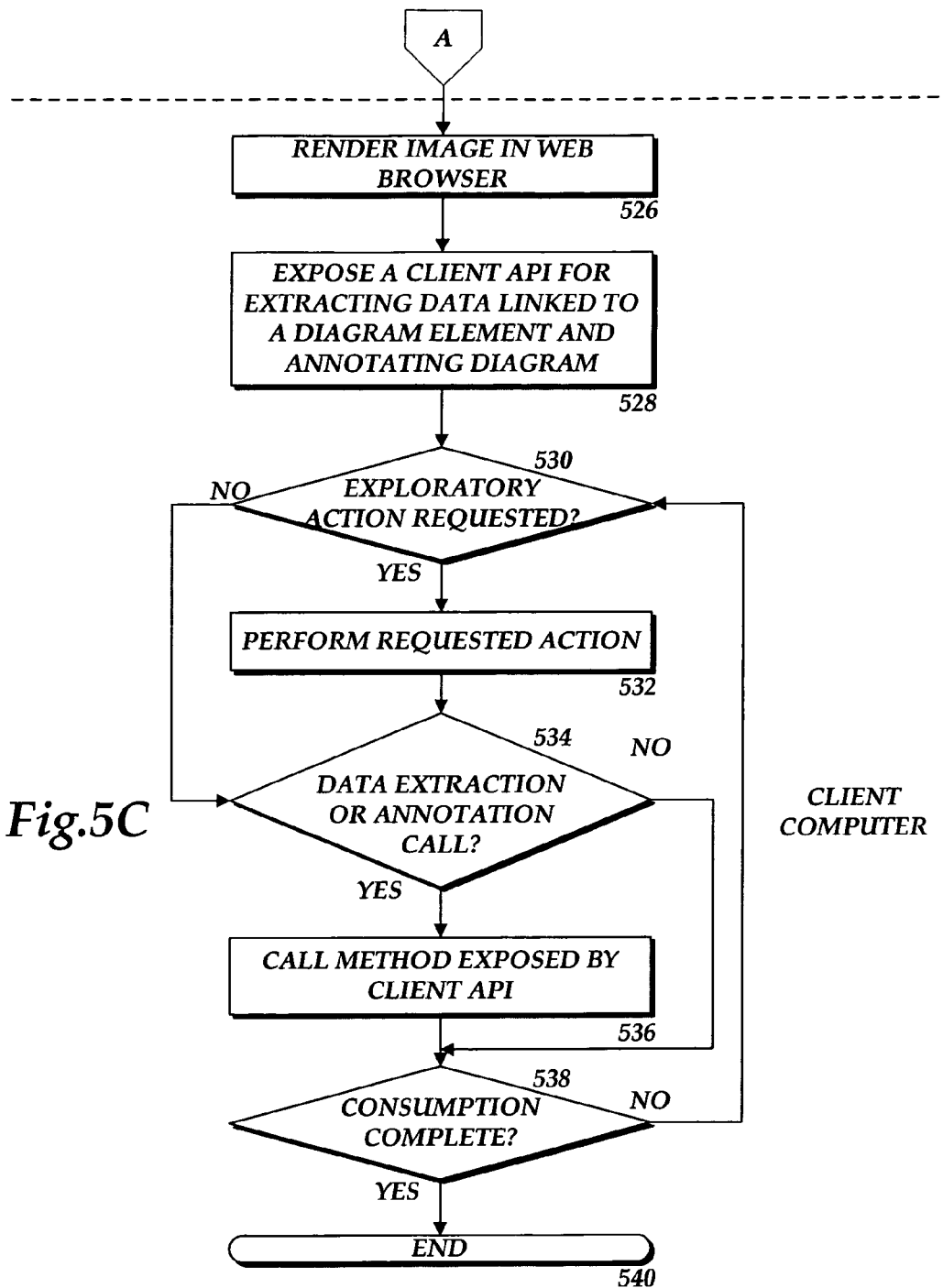

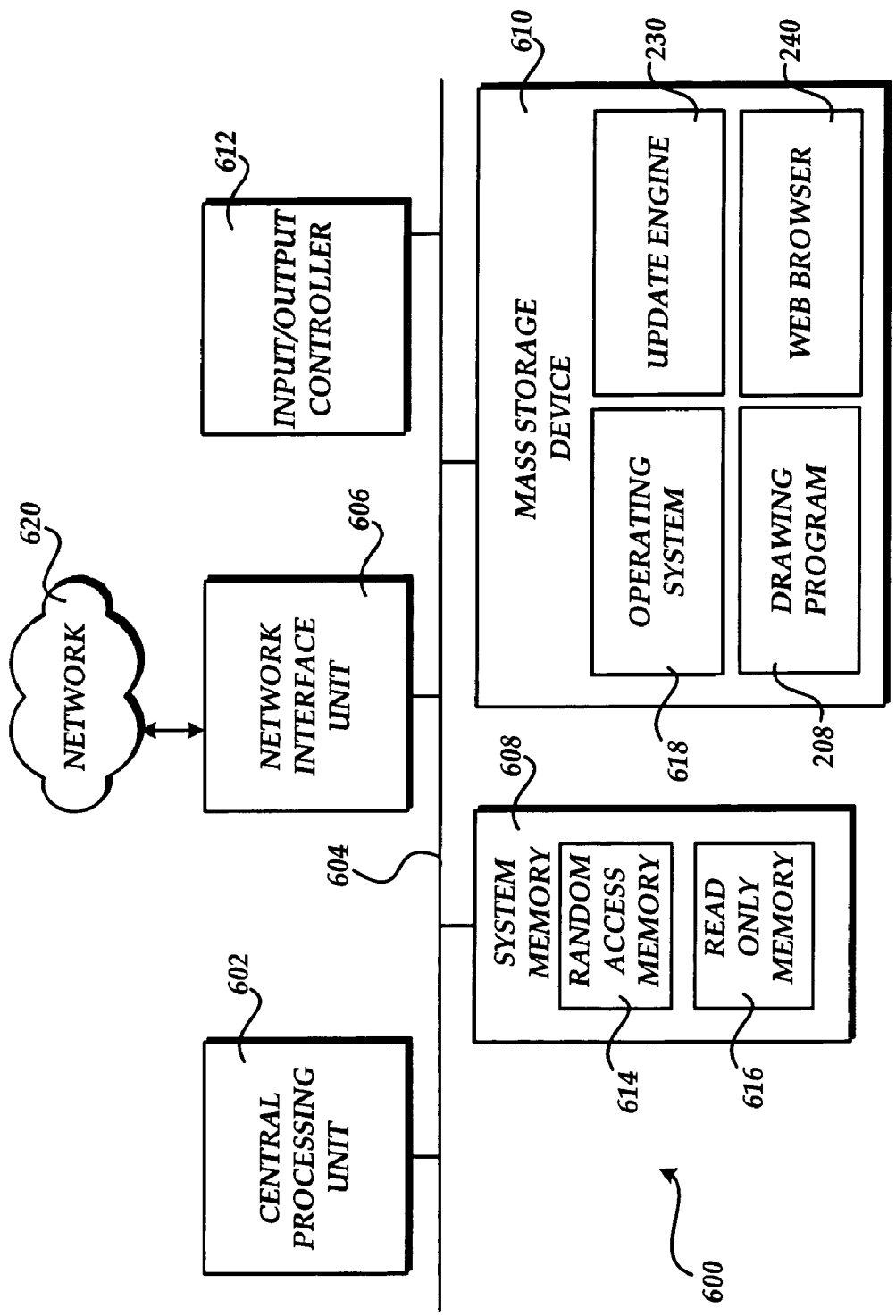

WEB-BASED VISUALIZATION, REFRESH, AND CONSUMPTION OF DATA-LINKED DIAGRAMS

BACKGROUND

Conventional drawing programs generally allow the creation and editing of drawings by providing a variety of shapes that can be selected and placed within the drawings. For instance, shapes such as squares, rectangles, circles, triangles, and other types of shapes may be placed within a drawing. Tools are also typically provided for orienting and sizing the shapes in the diagram as desired. Other tools may also be provided for drawing other types of shapes and performing other types of drawing functions.

Some conventional drawing programs provide a feature that allows data to be associated with the shapes in a drawing. For example, functionality may be provided for associating data stored at an external data source with the various attributes of a shape. In this way, the value of the external data may be utilized to specify the color, size, position, text, or other attributes of a shape within a drawing. External data may also be displayed in shapes as an additional visual element, such as an icon or a progress bar, which is displayed on or adjacent to the shape.

An equation may also be specified that defines how the value of the external data should modify the attributes of a shape. For instance, an equation may be defined that specifies that the color of the shape should be changed to red if a sales value retrieved from an external database is less than a specified value. Another formula may be defined that specifies that the color of the shape should be green when the sales value retrieved from the external database is greater than the specified value.

In addition to the creation of drawings, drawing programs also allow users to view and edit drawings created by other users using the same application or a compatible application. However, in order to view and edit a drawing created by another user, the appropriate drawing program utilized to create the drawing, or a compatible drawing program, must typically be installed on the computer on which the drawing is to be viewed.

In many cases, a user may simply be unable to view a drawing if they do not have a copy of the application program utilized to create the drawing installed on their computer. In other cases, it may be necessary for a user to locate, download, and install a compatible viewer application program for displaying the drawing on their computer in order to view the drawing. It may, however, be difficult for a user to locate, install, and execute such a viewer application. In yet other cases, a compatible version of the application program or viewer application may not be available for the type of device on which the user wishes to view the document. For instance, a user may wish to view a drawing on a personal digital assistant ("PDA") or a wireless mobile telephone for which a version of the application program utilized to create the drawing or a viewer application does not exist. This can be extremely frustrating for a user that has a need to view a drawing, including any shapes connected to external data contained therein, but who does not possess the necessary application program utilized to create the drawing or a compatible viewer application.

Some diagramming applications allow the user to export a diagram as a picture or a web page, which will allow other users to view the diagram using a world wide web ("Web") browser. However, the exported diagram will be viewed as a static picture that does not allow for any change to the shapes as a result of a change to the external data associated with the shapes. All links to external data are severed, providing a user viewing the diagram via a Web browser with potentially outdated information.

It is with respect to these considerations and others that the disclosure made herein is presented.

SUMMARY

Technologies are described herein for publishing a data-linked diagram to a world wide web ("Web") server and subsequently providing an updated diagram based on current external data to a requesting Web browser for viewing and additional consumption. In particular, through the utilization of the technologies and concepts presented herein, a drawing containing one or more shapes or other elements bound to external data sources can be rendered on a server computer for display using a standard viewer application program executing on a client computer, such as a Web browser application. Because the drawing is refreshed and rendered on the server computer, including any data-bound shapes contained therein, there is no need for the application program utilized to create the drawing or a specific viewer application for the drawing to be installed on the client computer to get an up-to-date drawing.

According to one aspect presented herein, a drawing program executing on a client computer provides functionality for creating a diagram that includes shapes or other diagram elements with attributes bound to external data sources. The drawing program also provides functionality for defining equations that define how the external data should be utilized to modify the attributes of an element. In this regard, the equations may reference data provided by external data sources. These equations and other information corresponding to static diagram elements and data-bound elements that may be used by a drawing program to render the diagram create a client diagram definition.

The drawing program also provides functionality for publishing a diagram to a server computer. When a request is received to publish a diagram to a server computer, the client diagram definition, including any equations utilized to modify shape attributes and data identifying bindings between diagram elements and external data, is converted to a server diagram definition that is legible by the server computer. A published diagram is generated that includes the server diagram definition and a representation of the diagram in a vector format. The drawing program publishes the published diagram to a server computer.

A request may be received at the server computer to view the published diagram. Such a request may be generated by a standard viewer application, such as a Web browser application program, executing on a client computer. When such a request is received, the server computer refreshes the data bindings for the diagram by obtaining updated values for any external data. The equations are then recalculated using the updated values to generate new results assigned to the shape attributes. The shape attributes within the vector representation of the diagram are then updated according to the new results.

Once the vector representation of the diagram has been updated with the updated results for the shape attributes, the vector representation of the diagram may be rasterized to generate a rasterized diagram in a standard image format if requested in a Web raster format. The rendered diagram, in either a Web raster format or a Web vector format, is then returned to the viewer application for display. According to various embodiments, a Web part may provide a user interface through which a user may interact with the rendered diagram to perform navigation and exploration actions such as panning, zooming, hyperlinking, visualizing any linked external data for each diagram element, and navigating within the multiple pages of the diagram.

Additionally, embodiments provide for exposing a client application programming interface ("API") to provide the end user with the ability, among others, to retrieve external data underlying the data-bound elements and to annotate the diagram as desired. In this manner, a diagram containing shapes or other diagram elements bound to an external data source is rendered on the server computer for display by the standard viewer application program executing on the client computer, while providing the end user with various navigation and diagram consumption capabilities via a Web browser or other viewer application program.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated diagrams.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5C are a flow diagram showing aspects of one embodiment provided herein for publishing a diagram to a server computer, rendering an updated diagram on a client computer via a Web browser, and consuming the updated diagram; and FIG. 6 is a computer architecture diagram showing an illustrative computer hardware and software architecture for a computing system capable of implementing aspects of the embodiments presented herein.

DETAILED DESCRIPTION

Figure 1:
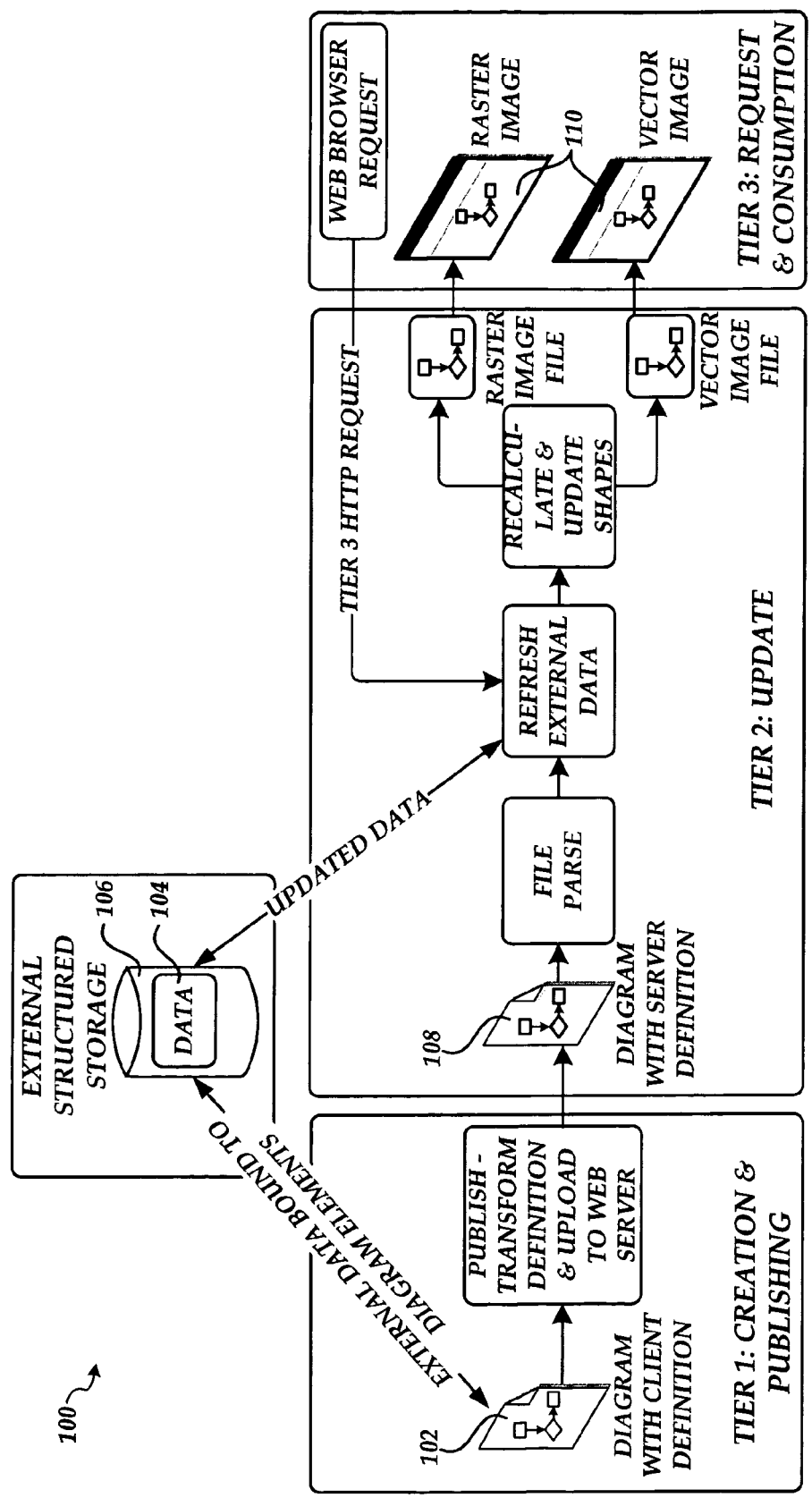
FIG. 1 is a block diagram showing aspects of a three-tiered diagram creation, update, and consumption process provided by the embodiments presented herein.

The following detailed description is directed to technologies for providing a refreshed data-linked diagram, which is created on a rich client and published to a Web server, to a Web browser for viewing and other consumption actions. Through the use of the technologies and concepts presented herein, a diagram can be created on a client computer, published to a server computer, and rendered on the server computer for display using a standard viewer application program. Because the published diagram is refreshed and rendered on the server computer, including any data-bound shapes contained therein, the application program utilized to create the diagram is not needed in order to view the published diagram. Rather, a standard viewer application, like a Web browser, can be utilized to view the published diagram.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for recalculating vector graphics on a server computer will be described.

Turning now to FIG. 1, details will be provided regarding aspects of a three-tiered data-linked diagram creation, update, and consumption process 100 according to various embodiments presented herein. In particular, for clarity purposes in introducing the various system components and associated processes described in the embodiments below, FIG. 1 visually depicts the process 100 in three tiers. Tier 1 includes the creation and publication of a diagram using a rich client computer. This client computer, as well as a server computer and client computer discussed in Tiers 2 and 3, will be described in detail below with respect to FIG. 2.

In Tier 1, a user creates a diagram 102 or other drawing that may include static elements, such as shapes and text whose visual attributes do not depend on external data, as well as one or more data-bound elements. Data-bound elements may include any shapes, lines, text, or any other element of a diagram that has one or more visual attributes that are linked to external data 104. As will be described further below, the visual attributes of the data-bound elements may include color, size, position, orientation, or textual content based on the external data 104 located at an external data source, such as the external structured storage 106. Throughout the disclosure provided herein, the external data source that stores the external data 104 will be referred to as structured storage 106. However, it should be appreciated that any amount and type of storage mediums may be used to store the external data 104 that is bound to the data-bound elements of the diagram 102.

Transformation equations and the results of those equations define the relationship between the external data 104 and the visual attributes of the data-bound elements. In this manner, the visual appearance of the data-bound elements are driven by the external data 104 retrieved from the structured storage 106. After creating the diagram 102, the user publishes the diagram 102 and the diagram 102 is uploaded to a server computer. As will be described in greater detail below, during the publishing process, a client-legible diagram definition corresponding to the diagram elements and any linked external data 104 is transformed into a server-legible diagram definition that may be evaluated and acted upon by the server computer. The diagram definitions include definitions for each element, which when analyzed together, determine how a diagram should be rendered. For illustration purposes, a practical example of the diagram creation and publication process of Tier 1 will now be described according to various embodiments.

According to one illustrative example, a network administrator is tasked with creating a data-bound diagram of the computer networks in the different buildings of a company's corporate headquarters. In doing so, the administrator uses a diagramming application to create network diagrams of each building. The administrator imports network status data from a structured data store, such as a structured query language ("SQL") server, into the diagram and associates the data to particular diagram shapes and creates rules to surface this data visually so that the network status of each computer network will be visible on the diagram through the use of color coding or other visual attributes.

After completing the diagram, the administrator publishes the diagram using a publishing feature of the diagramming application. Selection of the publishing control initiates the upload of the diagram to a shared location that can be accessed by diagram consumers and an update engine. The administrator may then be able to email links to a page to the appropriate personnel. The linked page would have associated logic that would request the diagram from the shared location. Subsequent selection of the link by another person will provide the person with a view of the diagram via a local Web browser with the data-bound shapes updated to reflect the color corresponding to the current status of the corresponding computer network.

Referring back to FIG. 1, after publishing the data-linked diagram 102, the process 100 enters Tier 2. At Tier 2, an update engine parses the server-legible diagram definition of the static and data-bound elements of the published diagram 108 and stores the element definitions in memory. Upon receiving a request from a Web browser of a consumption client computer in Tier 3, the update engine will refresh the external data 104 linked to the published diagram 108. To do so, for each of the data-bound elements, the update engine will connect to the underlying data storage system identified by the server-legible diagram definition, such as the structured storage 106 shown in FIG. 1, and retrieve the associated external data 104.

The transformation equations associated with the data-bound elements are each re-evaluated to calculate new results. These results are then utilized to regenerate the attributes associated with the data-bound elements. As each element's definition is updated, it is stored in memory to replace the older element definition to create an updated diagram definition that will be used to create a rendered diagram 110 for the consumption client computer in Tier 3. If the consumption client computer in Tier 3 has requested a raster version of the diagram, then the update engine will render the updated diagram definition to a Web raster format. If the consumption client computer in Tier 3 has requested a vector version of the diagram, then the update engine will assemble an equivalent visualization in a Web vector format.

At Tier 3, the consumption client computer receives the rendered diagram 110 from the server computer and displays the diagram using a standard viewer application like a Web browser. According to various embodiments, the server computer at Tier 2 provides a Web page to the consumption client computer that includes any number of on-page navigation and exploration tools for viewing and exploring the rendered diagram 110. As will be discussed in greater detail below, a server API exposed by the server computer may provide an end user with the capability of extracting the external data 104 and annotating the rendered diagram 110.

For illustration purposes, a practical example of the diagram consumption process of Tier 3 will now be described according to various embodiments. Continuing the illustrative example described above, a user receives an email from the network administrator that includes a link to the data-bound diagram of the computer networks in the various buildings of the company's corporate headquarters. The user clicks on the link in the email and his Web browser loads, displaying the rendered diagram 110 showing the network status for each computer network. The user notices that the network state has changed slightly since yesterday. Some servers are now red and others have exclamation marks next to them. These colors and exclamation marks are attributes assigned to the server representations in the diagram and linked to the network status data in the SQL server or other structured data source.

The user decides to explore the network using the pan and zoom controls of the Web page created by the administrator. He locates a server with an abnormal load and selects it within the diagram with a pointer tool to follow a hyperlink to an HTML report with additional details about the machine. The user calls a machine administrator who promptly fixes the problems. With the issues resolved, the user hits a "Refresh" button of the Web page's refresh control. After the rendered diagram 110 is refreshed using updated external data 104, the colors and other indicators return to normal and the user closes his browser.

Figure 2:
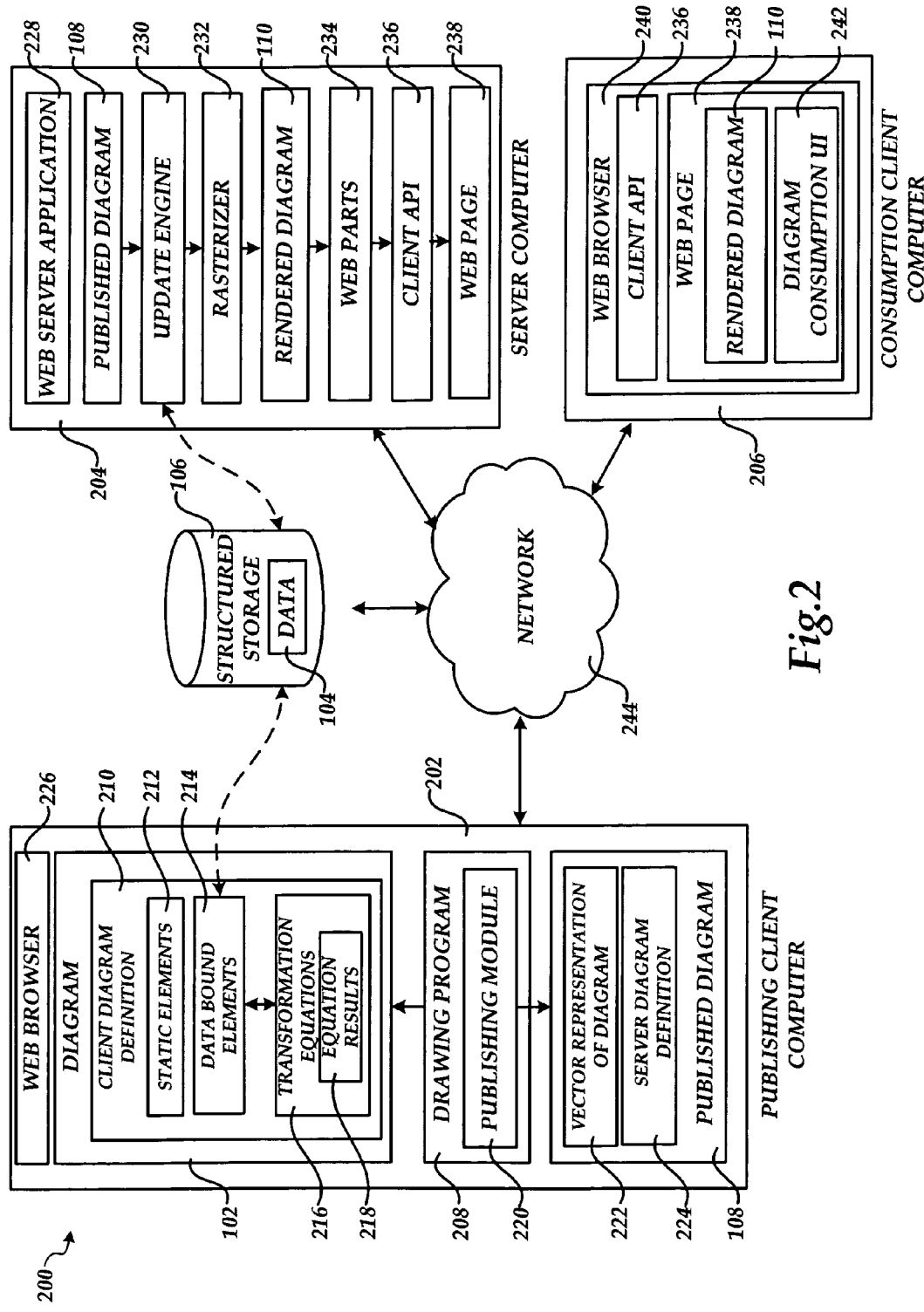
FIG. 2 is a combined network and software architecture diagram showing aspects of an illustrative operating environment and several software components provided by the embodiments presented herein.

Turning now to FIG. 2, details will be provided regarding an illustrative operating environment and several software components provided by the embodiments presented herein. In particular, FIG. 2 shows aspects of a system 200 for Web-based visualization, refresh, and consumption of a data-bound diagram. The system 200 includes a publishing client computer 202 and a server computer 204. The publishing client computer 202 comprises a standard desktop, laptop, or handheld computing system capable of executing the drawing program 208 and a Web browser 226.

As will be described in greater detail herein, the drawing program 208 comprises an executable application program capable of creating a diagram 102. The diagram 102 may include a multitude of visual elements laid out in virtually in any format. In particular, the diagram 102 may include any number of static elements 212 and any number of data-bound elements 214. Static elements 212 are those shapes, connectors, and other diagram elements that are not bound to any external data 104, while data-bound elements 214 include shapes, connectors, and other diagram elements that have visual attributes that are bound to an external data source. For instance, various attributes of the data-bound elements 214, such as the color, size, position, text, or orientation, may be linked to an external data source, such as the structured storage 106. In this manner, the visual appearance of the data-bound elements 214 can be driven by the data 104 retrieved from the structured storage 106. The drawing program 208 may also provide functionality for binding the attributes of the data-bound elements 214 to any other types of data sources external to the drawing program in addition to the structured storage 106.

According to various embodiments, the drawing program 208 provides functionality for creating the client diagram definition 210, which defines the diagram 102. The client diagram definition 210 includes element definitions corresponding to the static elements 212, the data-bound elements 214 and corresponding external data, and the transformation equations 216 that determine the visual attributes of the data-bound elements 214. The transformation equations 216 may be mathematical or textual equations that control a visual attribute according to external data 104, data entered directly into the diagram 102, and/or diagram parameters from within the diagram definition, such as the length of a line, the color of a line, or any other element parameters.

Equation results 218 are the results of the transformation equations 216 that utilize the external data 104 as parameters. The equation results 218 determine the visual attribute associated with a data-bound element 214. It should be appreciated that the equation results 218 may be equivalent to the external data 104 to which the data-bound element 214 is linked. For example, a transformation equation 216 may state, if external data 104=X, then the color of the corresponding shape is red. Assuming the external data 104=X, then the equation result 218 is X and the color of the data-bound element 214 should be red. As another example, the transformation equation 216 may state that some geometry, such as a flag, should be added to a shape if an average of a list of values from a spreadsheet falls into a particular range. In this instance, the equation result 218 would be the average that is compared to the range to determine whether a flag should be added to the shape in the diagram 102.

In one embodiment presented herein, the drawing program 208 also provides functionality for publishing the diagram 102 to a server computer 204. In particular, a diagram 102 having one or more data-bound elements 214 with attributes defined by a transformation equation 216 that references external data 104 may be published to the server computer 204. In order to publish the diagram 102 to the server computer 204, the drawing program 208 utilizes a publishing module 220. In response to receiving a request to publish the diagram 102 to the server computer 204, such as from a user, the publishing module 220 is executed.

As will be described in greater below, the publishing module 220 is operative to generate a published diagram 108 that is published to the server computer 204. In order to generate the published diagram 108, the publishing module 220 transforms client diagram definition 210 into a server diagram definition 224 that is legible to the diagram rendering functionality of the server computer 204. Similar to the client diagram definition 210, the server diagram definition 224 defines the published diagram 108 in terms of the static elements 212, the data-bound elements 214 and corresponding external data 104, and the transformation equations 216. The published diagram 108 includes a vector representation 222 that is defined by the server diagram definition 224. The vector representation 222 comprises a representation of the diagram 102 in an intermediate graphics format. In one implementation, the vector representation 222 is utilizing the SILVERLIGHT EXTENSIBLE APPLICATION MARKUP LANGUAGE ("XAML") from MICROSOFT CORPORATION of Redmond, Wash. It should be appreciated however that other types of languages for describing vector graphics may also be utilized.

Once the publishing module 220 has generated the vector representation 222 of the diagram 102 and the server diagram definition 224, these items are transmitted to the server computer 204 via a communications network, such as the network 224. The server computer 204 stores the published diagram 108 in an appropriate mass storage device. According to other aspects presented herein, the server computer 204 may also receive and respond to requests from a consumption client computer 206 to view the published diagram 108. Such a request may be received by a Web server application 228 from a Web browser 240 executing on the consumption client computer 206.

In response to receiving a request to view the published diagram 108, the server computer 204 executes an update engine 230. The update engine 230 may be any application, module, or combination of any number of applications or modules that is operative to perform the update operations of Tier 2 as described above with respect to FIG. 1. The update engine 230 is operative to utilize the server diagram definition 224, specifically the element definitions corresponding to the data-bound elements 214, to obtain updated values for externally referenced data 104.

For instance, in the example shown in FIG. 2, the update engine 230 communicates with the structured storage 106 to update the values for attributes in the published diagram 108 that reference the structured storage 106. Once updated values have been obtained, the update engine 230 evaluates the transformation equations 216 with the updated values for the element attributes obtained by the update engine 230. When the update engine 230 has completed evaluating the transformation equations 216 to obtain the updated values for the external data 104, the update engine 230 updates a portion of the vector representation 222 of the published diagram 108 to reflect the updated values. For instance, attributes or other markup language elements contained within the vector representation 222 may be replaced or modified to specify the updated value for the attribute.

Once the update engine 230 has updated the vector representation 222 of the published diagram 108, a rasterizer 232 may be executed to rasterize the vector representation 222 into a rasterized drawing if the request from the consumption client computer 206 requests a Web raster format. In one implementation, the rasterized drawing 136 is stored in a standard image format, such as the portable network graphics ("PNG") image format, that may be displayed without the assistance of a plug-in module by a standard viewer application, such as the Web browser 240. Alternatively, the consumption client computer 206 may request to view the published diagram 108 in a Web vector format. Depending on the requested format, the update engine 230 will interpret the published diagram 108 in the requested format to create a rendered diagram 110. It should be appreciated that depending on the vector format, a plug-in could be required.

According to various embodiments, the update engine 230 or other application executing on the server computer 204 may be utilized to create a Web page 238 comprising exploration and consumption tools. It should be appreciated that one implementation for creating the Web page 238 includes utilizing one or more Web parts 234. A Web part includes a set of controls for creating a Web page in which an end user can modify aspects of the displayed Web page from the Web browser. As an example, the rendered diagram 110 may be presented in a diagramming application Web part that provides the end user with exploration tools that allow the end user to pan, zoom, and follow hyperlinks associated with diagram elements. Moreover, a Web part may be added to present the end user with a user interface that allows the end user to view the external data 104 bound to a data-bound element 214. A user interface may additionally be provided to allow for page navigation within a multi-page diagram. An example of a user interface provided using a Web part will be described in detail below with respect to FIG. 4.

According to various embodiments, a client API 236 performs various functions. First, it exposes to a developer different elements of the diagram. Examples include, but are not limited to, the collection of pages of the diagram, the collection of shapes of the diagram, the associated data within a shape, the associated hyperlinks with a shape, the dimensions of a bounding box associated with a shape, and an identifier of a shape. The client API 236 further provides the developer with the ability to respond to various events, such as mouse events, a shape selection change, a page load complete indication, or any other detectable event. In doing so, the programmer may provide various consumption features to an end user via the Web browser 240 as a result of an associated event.

Moreover, the client API 236 provides the ability to annotate diagram elements. The developer may use data associated with a shape, which originated from a structured storage 106, and based on the data, annotate the diagram accordingly. For example, if all of the shapes on the drawing page have a cost property that comes from an external database, then the diagram shapes may have a corresponding value displayed on each shape in the diagram as described in the embodiments above. The developer could use the client API 236 to read the value off of the shape and then annotate the shape over any existing text or attribute with a highlight or any new attribute.

According to one implementation, the client API 236 includes Web page scripting language, such as JavaScript, that is operative to determine when the end user performs an action like selecting a shape, among others, and to retrieve the corresponding external data 104 and further take action based on the external data 104. It should be appreciated that the client API 236 is not limited to JavaScript and may be created in any suitable programming language. According to one implementation, the client API 236, the code using it, and data exposed through the API, start on the server computer 204 and are sent to the Web browser 240. At the Web browser 240, the client API 236 and the code that calls into it are run within the context of the Web browser 240. In this manner, API commands may be client-side, without needing to call back to the server computer 204 to execute the required operations. However, it is within the scope of the embodiments disclosed herein for methods within the client API 236 to issue commands through a network to the server computer 204. It should be appreciated that virtually any number and type of Web parts 234 and APIs may be utilized to provide for various types of diagram exploration and consumption functionality within the scope of this disclosure.

The rendered diagram 110 is returned to the Web browser 240 on the Web page 238 in response to the original request to view the published diagram 108 received at the server computer 204. The Web browser associated with the consumption client computer 206 displays the Web page 238 that includes the rendered diagram 110 and a diagram consumption user interface 242. The diagram consumption interface 242 provides the end user with various navigation tools and will be described in greater detail below with respect to FIG. 4.

Figure 3:
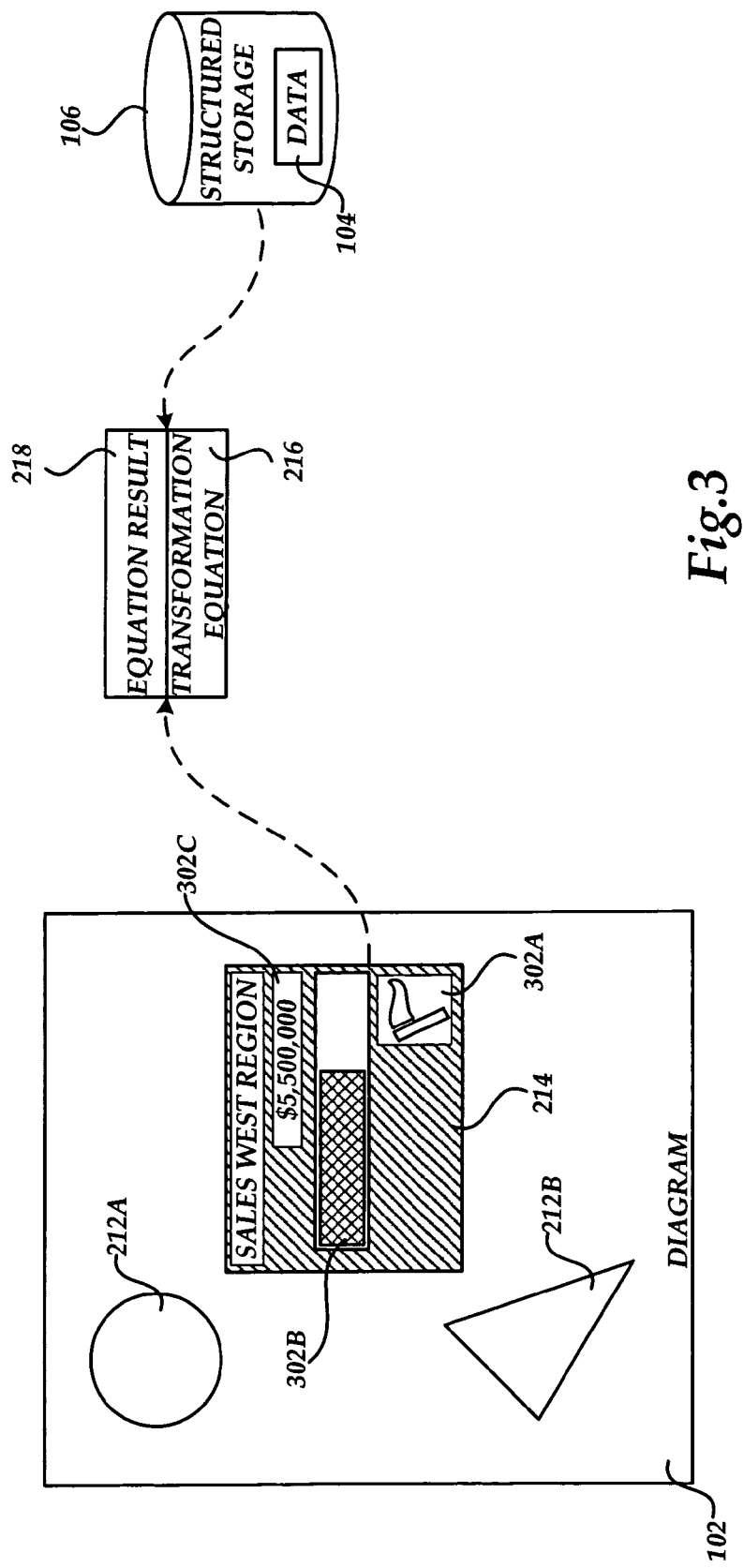
FIG. 3 is a combined screen and data structure diagram showing aspects of a diagram, shape attributes, and an underlying transformation equation and parameters utilized in the embodiments presented herein.

Referring now to FIG. 3, additional details regarding the functionality provided by the drawing program 208 for creating a diagram 102 and associating data-bound element 214 within the diagram 102 to external data 104 will be described. In particular, FIG. 3 shows the contents of an illustrative diagram 102. The diagram 102 illustrated in FIG. 3 includes the diagram elements 212A, 212B, and 214. Static elements 212A and 212B do not have visual attributes that depend on external data 104; however, the data-bound element 214 includes a number of attributes that specify the visual appearance for the element. As described briefly above, these attributes can be bound to external data 104, such as data stored in a structured storage 106. For example, the data-bound element 214 has a color attribute that has been bound to external data 104.

In the example shown in FIG. 3, the data-bound element 214 has its color attribute bound to a transformation equation 216. In this example, the equation references external data 104 contained in the structured storage 106. For instance, the transformation equation 216 may specify that the color attribute of the data-bound element 214 should be set to red if the external data 104 retrieved from the structured storage 106 is greater than a predefined number. In this example, the data-bound element 214 also includes text 302C that is bound to an equation result 218 from the transformation equation 216 using the external data 104 retrieved from the structured storage 106. In this example, the text 302C corresponds to a numeric equation result 218 using currency rules. For example, the transformation equation 216 may include a sum of a quantity of sales values stored as external data 104 in the structured storage 106. After applying the transformation equation 216, the equation result 218, which is the sum of all of the sales values in this example, equals $5,500,000. This equation result 218 is displayed as the text 302C on the data-bound element 214. It should be appreciated that a text attribute of the data-bound element 214 may be bound to an external text value in a similar manner.

According to aspects, the data-bound element 214 may also include graphical elements that are displayed in accordance with data retrieved from an external data source. These graphical elements are referred to herein as "data graphics." For instance, the data-bound element 214 illustrated in FIG. 3 includes a data bar 302B that varies depending upon the equation result 218 corresponding to the transformation equation 216 and the external data 104. A flag icon 302A may also be displayed in conjunction with the data-bound element 214 with its attributes varying based upon the equation result 218. It should be appreciated that the flag icon 302A may be only one of a set of icons that may be used as a visual attribute and that any combination of icons may be used according to the equation result 218.

Figure 4:
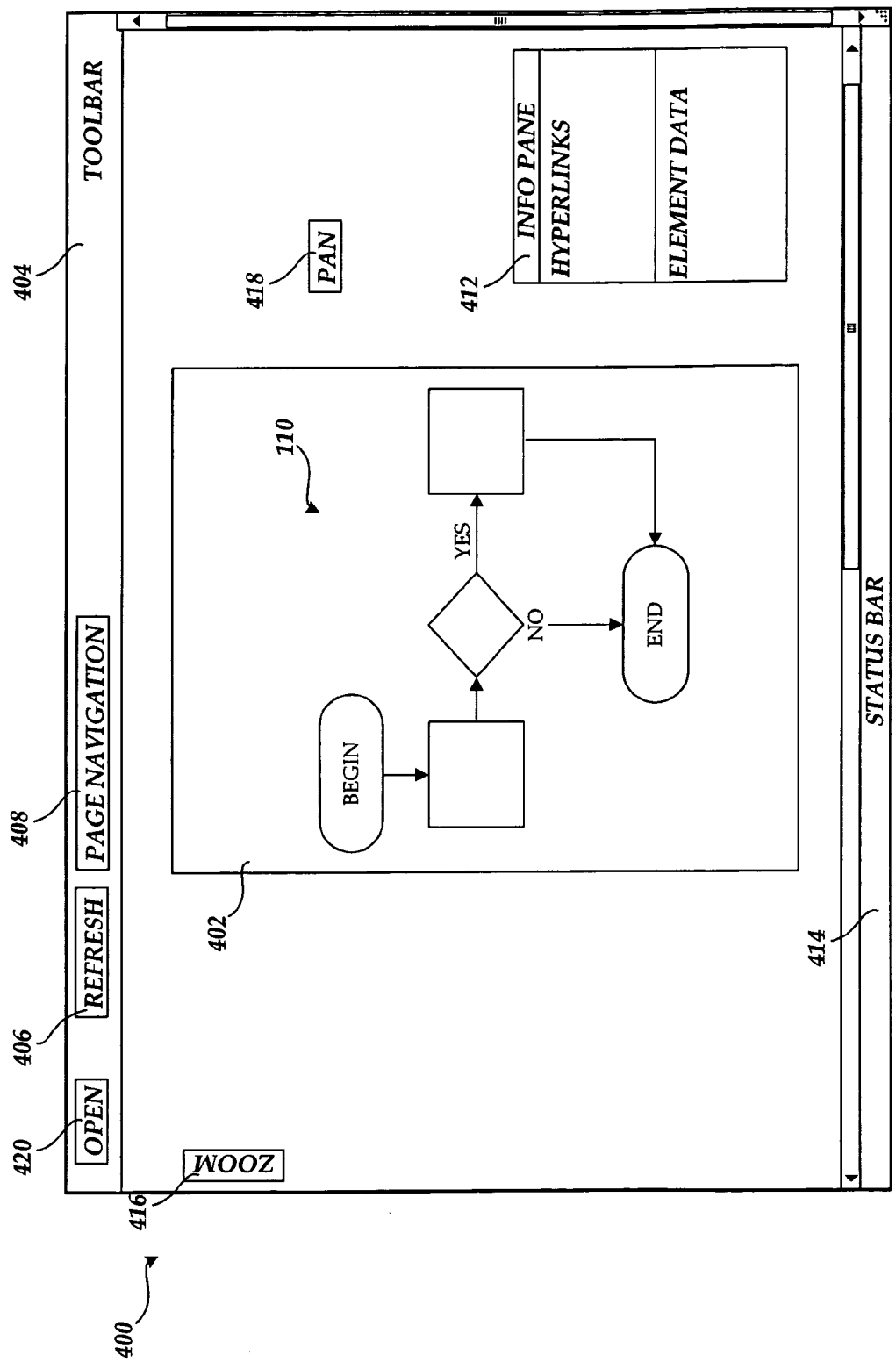
FIG. 4 is a screen diagram showing aspects of a user interface for consuming a diagram displayed by a Web browser according to embodiments presented herein.

Turning to FIG. 4, an illustrative screen diagram of a Web browser 240 of the consumption client computer 206 according to one embodiment will be described. FIG. 4 shows a diagram consumption user interface 400 that is provided to the end user for various navigation and consumption operations. As described above, the diagram consumption user interface 400 may be created and provided at the server computer 204 using a Web part 234. The user interface includes a drawing page 402 in which the rendered diagram 110 is displayed. A toolbar 404 provides various controls for consuming the rendered diagram 110. Examples of controls include a refresh control 406, a page navigation control 408, a zoom control 416, a pan control 418, and a diagram opening control 420. The refresh control 406 may be selected to initiate the update engine 230 to retrieve the external data 104 and refresh the data-bound elements 214 with the updated external data 104. After selecting the refresh control 406, the attributes of the data-bound elements 214 in the rendered diagram 110 will be regenerated to reflect any change in the external data 104 since the server diagram definition 224 was last updated and saved.

According to one implementation, the page navigation control 408 provides a drop-down menu when selected to allow the end user to select any available page of a multi-page diagram. According to an alternative embodiment, the end user may select page tabs 410 to navigate between pages. The zoom control 416 and pan control 418 allows the end user to zoom and pan, respectively, within the drawing page 402. The diagram opening control 420 allows the user to open the diagram 110 using the drawing program 208 that was used to create the diagram 110. This control may only be utilized if the underlying drawing program 208 is installed on the consumption client computer 206.

According to various embodiments, the diagram consumption user interface 400 provides an information pane 412 that allows the end user to view the external data 104 underlying one or more of the data-bound elements 214. A status bar 414 provides the end user with any type of information, such as information relating to the result of server and client operations. It should be appreciated that the embodiments described herein are not limited to components or configuration of the screen diagram shown in FIG. 4. Rather, any layout configuration, and number and type of controls may be presented to the end user through the user of applicable Web parts or APIs. Additionally, the applicable Web parts or APIs may allow for the end user to initiate any of the navigation and exploration features described above through any type of input, including but not limited to the selection of controls, mouse clicks on a shape or other diagram element, hovering a cursor over a particular portion of the diagram 110 or diagram consumption user interface 400, as well as any keyboard input.

Referring now to FIG. 5, additional details will be provided regarding the embodiments presented herein for creating, publishing, refreshing, and consuming a data-linked diagram. In particular, FIG. 5 is a flow diagram showing a routine 500 that illustrates aspects of the operation of the publishing client computer 202 for publishing a drawing to the server computer 204, aspects of the operation of the server computer 204 for refreshing the published diagram 108, and aspects of consuming the rendered diagram 110 according to one embodiment. It should be appreciated that the logical operations described herein are implemented (1) as a sequence of computer implemented acts or program modules running on a computing system and/or (2) as interconnected machine logic circuits or circuit modules within the computing system.

The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the drawing program 208 is utilized to create a diagram 102 that includes data-bound elements 214 that have attributes bound to external data 104 or that includes attributes that are defined by a transformation equation 216 that references external data. From operation 502, the routine 500 continues to operation 504, where the drawing program 208 generates the server diagram definition 224. The drawing program 208 publishes the diagram 102 to the server computer 204 at operation 506 to create the published diagram 108. As discussed above, the published diagram 108 includes the vector representation 222 of the diagram 102 as defined by the server diagram definition 224. In one implementation, the diagram 102 may also be published to the server computer 204 in a native format along with the published diagram 108.

The routine 500 continues from operation 506 to operation 508, where a determination is made as to whether a request to view the published diagram 108 has been received. As discussed above, when the server computer 204 receives the published diagram 108, the published diagram 108 is stored in an appropriate mass storage device. The server computer 204 may then receive and respond to requests to view the published diagram 108, such as from the Web browser 240. The Web server application 228 receives and responds to such requests by executing the various software components described herein. If a new request is received to view the published diagram 108, the routine 500 continues from operation 508 to operation 510.

At operation 510, the update engine 23 parses the server diagram definition 224 and stores the element definitions. For each data-bound element 214, at operation 512, the update engine 230 queries external data sources for the updated external data values. From operation 512, the routine 500 continues to operation 514, where the update engine 230 recalculates the transformation equations 216 and updates the corresponding attributes of the data-bound elements 214. The routine 500 continues to operation 516, where a determination is made as to the format in which the diagram was requested by the Web browser 240. If a Web raster format was requested, then the routine 500 continues to operations 518 and 520, where the update engine 230 interprets the server diagram definition 224 as a Web raster format, and returns a raster image file to the Web browser 240. From operation 520, the routine 500 continues to operation 526 and continues as described below.

However, if at operation 516, it is determined that the diagram was requested in a Web vector format, then the routine 500 continues to operations 522 and 524, where the update engine 230 interprets the server diagram definition 224 as a Web vector format, and returns a vector image file to the Web browser 240. From operation 524, the routine 500 continues to operation 526, where the rendered diagram 110 is displayed for the end user by the Web browser 240. The routine 500 continues from operation 526 to operation 528, where the client API 236 is exposed for extracting external data 104 underlying a data-bound element 214 and making any desired annotations to the diagram. It should be appreciated that one or more client APIs 236 may be utilized to expose methods for extracting external data 104, annotating the diagram, as well as for performing other operations. It should also be appreciated that the client API 236 may "extract" data through any suitable means, including but not limited to surfacing the data or requesting a refresh of the diagram in order to obtain the data.

From operation 528, the routine 500 continues to operation 530, where a determination is made as to whether an exploratory action has been requested by the user. As discussed above, a Web part 234 is one method that may be utilized to provide a diagram consumption user interface 242. The interface includes a number of controls, allowing a user to navigate between diagram pages, pan, zoom, follow hyperlinks, and view external data 104. If an exploratory action request has not been received, then the routine proceeds from operation 530 to operation 534 and continues as described below. However, if an exploratory action request is received, then the routine continues from operation 530 to operation 532, where the requested action is performed.

The routine 500 continues from operation 532 to operation 534, where a determination as to whether a data extraction or annotation call has been received. As previously discussed, the client API 236 provides a method for extracting the external data 103 corresponding to the data-bound elements 214 and annotating the diagram. If a data extraction or annotation call has not been received, then the routine 500 proceeds to operation 538 and continues as described below. However, if a data extraction or annotation request has been received, then the routine 500 continues to operation 536, where a call is made to the method exposed by the client API for extracting the external data 104 or annotating the diagram and the extracted data or annotation is provided and displayed. From operation 536, the routine 500 continues to operation 538, where a determination is made as to whether the diagram consumption has been completed. The diagram consumption by the end user may be determined to be complete if the Web page 238 is closed or if the Web browser is closed. If diagram consumption is complete, then the routine 500 continues to operation 540 and ends. However, if no attempt to close the Web browser 240 or the Web page 238, or otherwise cease diagram consumption, then the routine 500 returns to operation 530 and continues as described above.

FIG. 6 shows an illustrative computer architecture for a computer 600 capable of executing the software components described herein for visualizing, refreshing, and consuming a data-linked diagram using a Web browser 240 in the manner presented above. The computer architecture shown in FIG. 6 illustrates a conventional desktop, laptop, or server computer and may be utilized to execute the software components presented herein described as executing on the publishing client computer 202, the server computer 204, or the consumption client computer 206.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 operates in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the drawing program 208, the Web browser 240, and the update engine 230, each of which was described in detail above with respect to FIGS. 1-5C. The mass storage device 610 and the RAM 614 may also store other types of program modules.

Based on the foregoing, it should be appreciated that technologies for Web-based visualization, refresh, and consumption are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer storage medium having computer executable instructions stored thereon which, when executed by a computer, cause the computer to:
   receive a request from a Web browser to view a published diagram;
   retrieve a server-legible definition of the published diagram from storage in response to the request from the Web browser to view the published diagram;
   parse the server-legible definition of a plurality of diagram elements of the published diagram;
   for each data-bound diagram element of the plurality of diagram elements identified during parsing,
      retrieve external data associated with the data-bound diagram element,
      evaluate a data transformation equation defining the association between the external data and an attribute of the data-bound element to produce a data value,
      regenerate the server-legible definition of the data-bound element based on the data value produced from evaluating the data transformation equation, and
      replace the server-legible definition of the data-bound element in storage with the server-legible definition of the data-bound element regenerated based on the data value;
   render the server-legible definition of the plurality of diagram elements after parsing to create an updated diagram; and
   return the updated diagram to the Web browser.

2. The computer storage medium of claim 1, further comprising computer executable instructions stored thereon which, when executed by a computer, cause the computer to:
   expose a client API for providing a method for extracting the external data linked to the data-bound diagram element;

receive a call to the method for extracting the external data; and return the external data to the Web browser in response to receiving the call to the method for extracting the external data.

3. The computer storage medium of claim 1, further comprising computer executable instructions stored thereon which, when executed by a computer, cause the computer to:

expose a client API for providing a method for annotating the updated diagram;

receive a call to the method for annotating the updated diagram; and render an annotation within the updated diagram in response to receiving the call to the method for annotating the updated diagram.

4. The computer storage medium of claim 1, further comprising computer executable instructions stored thereon which, when executed by a computer, cause the computer to:

determine whether the request from the Web browser requests the updated diagram in a Web raster format or in a Web vector format;

if the updated diagram is requested in the Web raster format, interpret the server-legible diagram definition in the Web raster format before returning the updated diagram to the Web browser; and if the updated diagram is requested in the Web vector format, interpret the server-legible diagram definition in the Web vector format before returning the updated diagram to the Web browser.

5. The computer storage medium of claim 1, wherein returning the updated diagram to the Web browser comprises:

creating a Web page that comprises a diagramming application Web part for rendering the updated diagram and a navigation Web part that provides an exploration tool for diagram consumption; and returning the Web page to the Web browser.

6. The computer storage medium of claim 5, wherein the exploration tool comprises at least one control operative to pan, zoom, follow a hyperlink, view external data, navigate multiple pages of the updated diagram, or open the updated diagram in a diagramming application.

7. The computer storage medium of claim 1, wherein the attribute is associated with a visual appearance of the data-bound element.

8. The computer storage medium of claim 1, wherein the attribute is conditional upon a data value resulting from the transformation equation, and wherein the external data is a parameter of the transformation equation.

9. A method for Web-based visualization and consumption of data-linked diagrams, the method comprising:

receiving from a Web browser a request to view a published diagram;

retrieving a server-legible definition of the published diagram in response to the request to view the published diagram;

parsing the server-legible definition of a plurality of diagram elements of the published diagram;

for each data-bound diagram element of the plurality of diagram elements identified during parsing, retrieving external data associated with the data-bound diagram element, evaluating a data transformation equation defining the association between the external data and an attribute of the data-bound element to produce a data value, regenerating the server-legible definition of the data-bound element based on the data value produced from evaluating the data transformation equation, and replacing the server-legible definition of the data-bound element in storage with the server-legible definition of the data-bound element regenerated based on the data value;

rendering the server-legible definition of the plurality of diagram elements after parsing to create an updated diagram; and returning the updated diagram to the Web browser.

10. The method of claim 9, further comprising:

exposing a client API for providing a method for extracting the external data linked to the data-bound diagram element;

receiving a call to the method for extracting the external data; and returning the external data to the Web browser in response to receiving the call to the method for extracting the external data.

11. The method of claim 9, further comprising:

exposing a client API for providing a method for annotating the updated diagram;

receiving a call to the method for annotating the updated diagram; and rendering an annotation within the updated diagram in response to receiving the call to the method for annotating the updated diagram.

12. The method of claim 9, further comprising:

determining if the request from the Web browser requests the updated diagram in a Web raster format or in a Web vector format;

if the updated diagram is requested in the Web raster format, interpreting the server-legible diagram definition in the Web raster format before returning the updated diagram to the Web browser; and if the updated diagram is requested in the Web vector format, interpreting the server-legible diagram definition in the Web vector format before returning the updated diagram to the Web browser.

13. The method of claim 9, wherein the attribute is associated with a visual appearance of the data-bound element.

14. The method of claim 9, wherein the attribute is conditional upon a data value resulting from the transformation equation, and wherein the external data is a parameter of the transformation equation.

15. The method of claim 9, wherein returning the updated diagram to the Web browser comprises:

creating a Web page that comprises a diagramming application Web part for rendering the updated diagram and a navigation Web part that provides an exploration tool for diagram consumption; and returning the Web page to the Web browser.

16. The method of claim 15, wherein the exploration tool comprises at least one control operative to pan, zoom, follow a hyperlink, view external data, navigate multiple pages of the updated diagram, or open the updated diagram in a diagramming application.

17. A system for Web-based visualization and consumption of data-linked diagrams, the system comprising a server computer executing a server application configured to:

receive a request from a Web browser to view a published diagram;

retrieve a server-legible definition of the published diagram from storage in response to the request from the Web browser to view the published diagram;

parse the server-legible definition of a plurality of diagram elements of the published diagram;

for each data-bound diagram element of the plurality of diagram elements identified during parsing, retrieve external data associated with the data-bound diagram element, evaluate a data transformation equation defining the association between the external data and an attribute of the data-bound element to produce a data value, regenerate the server-legible definition of the data-bound element based on the data value produced from evaluating the data transformation equation, and replace the server-legible definition of the data-bound element in storage with the server-legible definition of the data-bound element regenerated based on the data value;

render the server-legible definition of the plurality of diagram elements after parsing to create an updated diagram; and return the updated diagram to the Web browser.

18. The system of claim 17, wherein the server application is further configured to:

expose a client API for providing a method for extracting the external data linked to the data-bound diagram element;

receive a call to the method for extracting the external data; and return the external data to the Web browser in response to receiving the call to the method for extracting the external data.

19. The system of claim 17, wherein the server application is further configured to:

expose a client API for providing a method for annotating the updated diagram;

receive a call to the method for annotating the updated diagram; and render an annotation within the updated diagram in response to receiving the call to the method for annotating the updated diagram.

20. The system of claim 17, wherein the server application is further configured to:

determine whether the request from the Web browser requests the updated diagram in a Web raster format or in a Web vector format;

if the updated diagram is requested in the Web raster format, interpret the server-legible diagram definition in the Web raster format before returning the updated diagram to the Web browser; and if the updated diagram is requested in the Web vector format, interpret the server-legible diagram definition in the Web vector format before returning the updated diagram to the Web browser.

* * * * *